United States Patent [19]

Pope et al.

[11] Patent Number: 5,006,348
[45] Date of Patent: Apr. 9, 1991

[54] METHOD FOR MANUFACTURE OF SWISS CHEESE

[75] Inventors: Brent K. Pope, Wildwood; Susan P. Monckton, Glen Ellyn; Kaser R. Nath, Glenview, all of Ill.

[73] Assignee: Kraft General Foods, Inc., Glenview, Ill.

[21] Appl. No.: 518,812

[22] Filed: May 4, 1990

[51] Int. Cl.$^5$ .................... A23C 19/068; A23C 19/02
[52] U.S. Cl. ........................................ 426/40; 426/36; 426/491; 426/492
[58] Field of Search ................... 426/36, 40, 491, 492, 426/495, 582

[56] References Cited

U.S. PATENT DOCUMENTS

| | | | |
|---|---|---|---|
| 1,334,693 | 3/1920 | Doane | 426/40 |
| 4,242,362 | 12/1980 | Grigsby et al. | 426/40 |
| 4,366,174 | 12/1982 | Kneubuehl et al. | 426/40 |
| 4,820,530 | 4/1989 | Moran et al. | 426/40 |

*Primary Examiner*—Marianne Cintins
*Attorney, Agent, or Firm*—Fitch, Even, Tabin & Flannery

[57] ABSTRACT

In accordance with the method of the present invention for manufacture of Swiss cheese from milk, the fat level of milk is standardized to about 3.5%. The milk is subjected to membrane processing by ultrafiltration and diafiltration to provide a retentate with particular characteristics. The retentate is then fermented with a particular blend of a coccus culture and a high level of a rod culture. The usual propionic acid-forming microorganism, such as *Propionibacterium shermannii*, is used. The fermentation is desirably carried out at high temperatures to achieve the results of the invention. The fermented retentate is then evaporated to a solids level desired in the finished Swiss cheese, which is generally in the range of 35% to 41% moisture. The fermented and evaporated product is suitable for packing into containers to be cured and to provide Swiss cheese without further manipulation or treatment. The particular conditions are necessary to provide the desired Swiss cheese.

14 Claims, No Drawings

METHOD FOR MANUFACTURE OF SWISS CHEESE

The present invention relates to the manufacture of Swiss cheese from a retentate and, more particularly, relates to a process for the manufacture of Swiss cheese from milk which has been subjected to ultrafiltration and evaporation.

BACKGROUND OF THE INVENTION

Swiss cheese is one of the most difficult varieties of cheese to make. Control of the quality and composition of the milk, propagation and use of the essential bacterial starters and the details of manufacture are complicated procedures. Three species of bacteria have conventionally been used as starters during a fermentation period: these being a coccus culture, and a rod culture and a propionic acid forming microorganism. Usually *Streptococcus thermophilus* is used as the coccus culture; *Lactobacillus bulgaricus* or *Lactobacillus lactis* is used as the rod culture, and *Proprionibacterium shermanii* has been used as the propionic acid-forming microorganism. A milk clotting enzyme, such as rennet is also used and added in an amount such that a curd firm enough to cut is formed in about 30 minutes. The fermentation proceeds at a temperature of from about 88° F. to about 94° F. The curd is cut and worked for about 30 minutes to an hour. The curd is then heated over a period of about 30 minutes to a cooking temperature of between 120° F. and 128° F. The curd is stirred at the cooking temperature for about 30 minutes to an hour. Whey is then removed and the curd is processed into blocks for curing to produce Swiss cheese with typical eye formation. The total time required for fermentation, working and cooking is usually less than about 3 hours.

The Lactobacillus and Streptococcus starters produce lactic acid which aids in expelling the whey and contributes to the breakdown of the curd during ripening. The propionic acid forming microorganisms are largely responsible for the characteristic flavor and eye formation of Swiss cheese.

Swiss cheese manufacture is characterized by the use of temperatures during fermentation and cooking temperatures after fermentation; of from 88° F. to 94° F. and from 120° F. to 128° F., respectively.

The manufacture of cheese and cheese products from milk through preparation of a retentate by membrane processes, such as ultrafiltration and diafiltration, for removal of salts, lactose and water, has been taught in various patents and literature references. From the large variety of methods and procedures which have been proposed for the manufacture of cheese and cheese products from retentates, it is apparent that the physical chemistry of milk is complex and the interactions between the protein, fat, salts and other components of milk are affected by utilization of the retentate. It is also apparent that methods and procedures which have been proposed for treatment of a retentate vary in the manufacture of cheeses of differing varieties. For example, some procedures, such as disclosed in U.S. Pat. No. 4,820,530 U.S. patent application Ser. No. 649,838, filed on Sept. 11, 1984, to Moran et. al. and assigned to the same assignee as the present application, disclose the desirability of certain cheese make conditions to achieve the desired results. There is no teaching, however, in these prior art cheese make procedures as to a procedure for the manufacture of Swiss cheese from retentate without a whey draining step. U.S. Pat. No. 4,379,170 to Hettinga et al. discloses a process for making cheese, including Swiss flavored cheese wherein skim milk is concentrated, a portion of the skim milk is concentrated by ultrafiltration, and a portion of the concentrated skim milk is fermented. The concentrated skim milk, fermented concentrated skim and cream are mixed together in suitable proportions to provide a substrate suitable for the manufacture of cheese. The substrate is then reacted with a coagulant, such as rennet, to provide a coagulum. The coagulum is cut to provide curd and whey and the whey is drained. The Hettinga et al. patent, of course, does not teach a method for manufacture of Swiss cheese directly from a retentate without the use of a whey drawing step.

PCT Application No. WO82/01806 discloses a process which permits evaporation of water from fermented retentate. The process includes four steps: (1) selective concentration of milk to form a retentate; (2) increasing the ionic strength of the retentate by the addition of a salt, such as sodium chloride, so as to maintain it in the liquid phase during fermentation; (3) fermenting the retentate and (4) removing water from the fermented retentate to produce a cheese base containing substantially all the casein and whey proteins originally present in the milk.

A patent to Coulter, et al., entitled "Cheese Manufacture from Molecular Sieved Milk," issued Oct. 26, 1976, U.S. Pat. No. 3,988,481, teaches the preparation of cheese from milk which has been de-lactosed and de-watered by a process involving molecular sieving a standardized milk to separate and remove lactose and water-soluble minerals from the milk to render the milk substantially sugar-free, and adding a curd-forming agent to produce curd. The resulting curd is subjected to conventional handling without substantial syneresis to produce a cheese.

A patent to Stenne, entitled "Method for the Manufacture of Cheeses," issued Aug. 12, 1975, U.S. Pat. No. 3,899,596, discloses a process for the production of a cheese which comprises treating milk by ultrafiltration to obtain a product having at least some of the protein constituents of the milk, rennetting the liquid product after inoculation with suitable ferments, and introducing a batch of the rennetted liquid into a vertical chamber in which it is left to coagulate. The coagulum is cut into slabs which provide the end product cheese.

A patent to Maubois, et al., entitled "Manufacture of Cheese from Ultrafiltered Milk," issued Oct. 21, 1975, U.S. Pat. No. 3,914,435, teaches cheese made from heat-treated milk and without conventional draining of whey by a process which involves ultrafiltering of the milk to produce a concentrate having essentially the composition of cheese produced by conventional cheese making processes. The process enables the milk, after ultrafiltration, to be heat-treated without making the milk more difficult to coagulate with rennet, which difficulty normally occurs when milk is heated to higher temperatures.

A patent issued to Wargel, et al., entitled "Process and Products from the Manufacture of Cheese-flavored Products," issued June 13, 1981, U.S. Pat. No. 4,244,971, teaches the manufacture of cheeses and process cheeses, from ultrafiltered milk.

A patent entitled "Process for Preparing Cheese base," issued Aug. 30, 1983, to Rubin, et al., U.S. Pat. No. 4,401,679, discloses a process for preparing cheese base by concentrating milk through ultrafiltration, combined with diafiltration and evaporation, wherein the retentate from the ultrafiltration is inoculated with an acid culture before evaporation, and after evaporation acidification proceeds to completion after packaging.

Further, cheese base material has been taught by evaporating moisture from retentate under turbulent conditions to provide a lower moisture condition. Such a process is described in an article by Ernstrom, et al., entitled "Cheese base for Processing: A High-yield Product from Whole Milk by Ultrafiltration," published in the *Journal of Dairy Science,* Volume 63, 223–234 (1980). The article teaches a process wherein whole milk having normal pH, or acidified to a pH of 5.7, is concentrated by ultrafiltration to about 40 percent of the original milk weight and diafiltered at constant volume until a desired ratio of lactose to buffer capacity is established. Then the retentate is further concentrated by ultrafiltration to 20 percent of the original milk weight. The retentate is then inoculated with cheese starter and incubated to completely ferment the residual lactose, pH control being achieved by controlling the level of lactose from the diafiltration step of the process. The product is further concentrated in a swept-surface vacuum-pan evaporator or a Luwa evaporator. It is pointed out that the use of a batch evaporator is necessitated when the retentate, upon fermentation, curdles or coagulates, since such a product cannot be readily processed in any continuous-flow evaporator.

It is known to add salt during fermentation to prevent coagulation and this was understood many years ago. See: LeLait/November-December, 1974/No. 539/540. Further, it has been disclosed that salt in the retentate may facilitate evaporation as disclosed in an Australian Application, which is the subject of a published application under the Patent Cooperation Treaty WO32/01306, published June 10, 1982.

The prior art specifically teaches that addition of rennet or other coagulating enzymes to high-solids milk systems causes rapid coagulation and is a condition to be avoided during evaporation, since, according to the prior art, the evaporation is highly inefficient after coagulation occurs. On the other hand, the presence of coagulating enzymes may be desired, particularly in higher-solids cheese, to provide the conventional presence of para kappa casein by cleavage of kappa casein. The kinetics of enzymatic coagulation of milk is disclosed by Alfred Carlson, in a thesis published in 1982, at the University of Wisconsin, entitled "The Kinetics of Enzymatic Coagulation of Milk."

In the conventional making of cheese with rennet, the macro peptides formed by rennet action are lost in the whey with consequent reduction in yield and loss of nutritious milk protein material. Accordingly, it would be desirable to enjoy the benefit of rennet action while avoiding whey removal with consequent loss of macro peptides.

The prior art teaches many different steps in respect to the manufacture of cheeses and cheese products from milk retentates. Evaporation of milk retentates is a previously known technique, but the resultant product does not have desired Swiss cheese curd character. Also, much of the prior art is directed toward the manufacture of higher moisture or soft cheeses.

In summary, the prior art is not directed to the manufacture of improved Swiss cheese, despite its many teachings relating to the manufacture of cheeses and cheese products from retentates derived from milk. There has been a lack of a commercial process for producing Swiss cheese from milk utilizing a retentate and an evaporating step.

It is a principal object of this invention to provide a Swiss cheese from a milk retentate followed by evaporation, the cheese having a typical Swiss cheese flavor, body and texture characteristics.

A further object of this invention is to provide Swiss cheese from milk which is stable and does not oil-off, and is manufactured by processing a milk retentate with evaporation.

Another object of the invention is to provide a process for the manufacture of Swiss cheese in which the milk proteins have been subjected to the action of a milk clotting enzyme but which process avoids loss of macro peptides.

Still further objects and advantages of the invention will become apparent by reference to the following description.

SUMMARY OF THE INVENTION

In accordance with the method of the present invention for manufacture of Swiss cheese from milk, the fat level of milk is adjusted to about 3.5%. The milk is subjected to membrane processing by ultrafiltration and diafiltration to provide a retentate with particular characteristics. The retentate is then fermented with a particular blend of a coccus culture and high level of a rod culture. The usual propionic acid-forming micro-organism, such as *Propionibacterium shermanii,* is used. The fermentation is carried out at unusually high temperatures to achieve the results of the invention. The fermented retentate is then evaporated to a solids level desired in the finished Swiss cheese, which is generally in the range of 35% to 41% moisture. The fermented and evaporated product is suitable for packing into containers to be cured and to provide Swiss cheese without further manipulation or treatment. The particular conditions are necessary to provide the desired Swiss cheese.

DETAILED DESCRIPTION OF THE INVENTION

In accordance with this invention for the manufacture of Swiss cheese, whole milk is treated by ultrafiltration and diafiltration to provide a retentate having between about 70% and about 60% moisture; between about 0.7% and about 2.5% salts, and between about 1.2% and about 2.5% lactose. All percentages used herein are by weight, unless otherwise indicated. The whole milk is standardized to have between about 3.0% and 3.6% fat and a protein to fat ratio of from about 0.79 to about 1.0 prior to being treated to provide the retentate. The fat content of the retentate can be adjusted by standardization of the milk or by addition of cream.

Various techniques are known in the art for achieving the indicated retentates. Commercial apparatus is marketed and available for the preparation of such retentates, and the apparatus is in present use in the cheese industry. The operation of such apparatus is now believed to be within the skill of the art. Preferably, in the practice of the invention, the milk is treated by ultrafiltration and diafiltration to provide the desired level of constituents in the retentate.

The total solids of the retentate should not be so high as to result in gelation of the retentate during processing and it has been found that the total solids content of the retentate should be less than about 48% and should be greater than about 30%.

In the conventional manufacture of Swiss cheese, the coccus culture is added to the milk at a level of about 1000 times the level of the rod culture, i.e., at the initiation of the fermentation there are about 1000 times more coccus cells than rod cells. The coccus culture is usually added at a level of about $10^6$ cells per ml of milk and the rod culture is added at a level of about 600 cells per ml of milk. In such a mixed rod and coccus culture, the coccus culture initiates fermentation by metabolizing the glucose moiety of lactose, and the galactose moiety remains. After a period of growth of the coccus culture, the galactose level increases sufficiently that the coccus growth rate declines and the rate of growth of the rod culture begins to increase. The coccus culture is, thus, galactose negative. The initial rate of coccus growth is vastly greater than the rate of rod growth which competes for metabolism of the lactose. By the time that the fermentation process is completed, however, and a curd has formed, the level of coccus cells and rod cells are approximately equal, i.e., the ratio of coccus cells to rod cells is about 1:1. The presence of the coccus cells and rod cells per se is not important, but the final result of their approximately equal level provides the desired acid and flavor in the final Swiss cheese product.

In accordance with the present invention for the manufacture of Swiss cheese, a retentate is used as the substrate for fermentation rather than milk which is used in the conventional manufacture of Swiss cheese. Due to the disparity which exists between the total solids and the lactose in the retentate as compared to that in milk, the dynamics of fermentation are completely altered. The retentate of the invention has a total solids of from about 30% to about 40% including a lactose level of from about 1.2% to about 2.5%, i.e., a lactose level on a solids basis of from about 3% to about 8.3%. The average composition of milk is approximately 87.2% water, 3.7% fat, 3.5% protein, 4.9% lactose and 0.7% ash, i.e., a total solids level of about 13% including a lactose level of about 5%. The lactose level on a solids basis is 38%. In accordance with the invention, it has been determined that the fermentation conditions of a retentate must be carefully controlled to attain a Swiss cheese product comparable in quality to that of conventional Swiss cheese made from milk.

Firstly, the rod culture is used at levels of from about 0.1 to about 6 times the level of the coccus culture, i.e., at a level that is at least 500 times the level of rod culture that is used in the conventional manufacture of Swiss cheese. Preferably, the rod culture and the coccus culture are used at about the same level, i.e., at a ratio of about 1:1. The rod culture is added to the retentate at a level of from about $10^4$ to about $10^6$ cells per ml of retentate and the coccus culture is added at a level of from about $10^4$ to about $10^6$ cells per ml of retentate.

Secondly, relatively high levels of lactose are present in the retentate of the present invention as compared to prior art retentates. In the fermentation of retentates to produce American cheese, such as is taught in U.S. Pat. No. 4,820,530 to Moran et al, a coccus starter culture, such as S. lactis, is commonly used. Unlike the conventional manufacture of American cheese, there is no whey drainage step after fermentation and there is no opportunity to remove any residual lactose that might remain after fermentation. The presence of any substantial residual level of lactose is undesirable since this could result in producing a grainy texture in the cheese. Accordingly, the lactose level of retentates utilizing starter cultures for fermentation is adjusted to be relatively low, i.e., usually below about 1%, for two reasons. The low level of lactose acts as a self limiting mechanism for controlling the level of lactic acid and pH that is developed. Once the low level of lactose is metabolized, no further acid can be produced. This is important since it is not desirable to heat the retentate after fermentation to stop the activity of the starter culture as is done in the conventional manufacture of American cheese and Swiss cheese. Secondly, the complete utilization of a low level of lactose by the starter culture to develop the desired acidity results in leaving no substantial residue of lactose. The level of lactose in the retentates of the invention for producing Swiss cheese is a relatively high level of from about 1.2% to about 2.5%. Moreover, the level of lactose is preferably about twice the level of lactose that is present in those retentates which use American-type cheese starter cultures, such as S. lactis and S. Cremoris.

As previously indicated, the coccus culture is galactose negative. The rod cultures most commonly used in the conventional manufacture of Swiss cheese are *Lactobacillus lactis* and *Lactobacillus bulgaricus*, which are also galactose negative. Even at the high level of use of the rod culture to the coccus culture in accordance with the present invention, the coccus culture predominates in the metabolization of the lactose available and the growth rate of coccus culture is greater than the growth rate of galactose negative rod cultures at the start of fermentation. While not wishing to be bound by any theory, it is believed that because of the relatively high level of lactose that is present in the retentate and because of the high level of use of the rod culture, the growth rate of the rod culture eventually catches up and surpasses the growth rate of the coccus culture. This results in the establishment of the desired acid level and flavor development, even though the absolute level of lactose, on a solids basis, is so much lower than that of whole milk.

While galactose negative rod cultures can be used in the method of the invention, an undesirable high proportion of coccus cells to rod cells can sometimes result if fermentation conditions are not carefully monitored and controlled. Accordingly, in an important embodiment of the present invention, a rod culture is used that can at least partially metabolize galactose, even if the rate of metabolization is relatively slow. For this reason, it has been determined that the rod culture, *Lactobacillus helveticus*, is particularly suitable for use in the method of the invention.

Thirdly, it has been determined that high fermentation temperatures are required to effect development of desired acidity within a reasonable time. The fermentation temperatures are high when compared to the fermentation temperatures conventionally used in the manufacture of Swiss cheese. In accordance with the method of the invention, fermentation proceeds at a temperature of from about 92° F. to about 118° F. and preferably proceeds at a temperature of from about 98° F. to about 105° F. Fermentation is continued until the acid in the retentate has lowered the pH to within the range of from about 4.8 to about 5.6, which occurs in a period of from about 5 to about 15 hours. At fermentation temperatures below the lower temperature of the preferred range, i.e., below 98° F., fermentation times can sometimes extend beyond 15 hours to develop the required pH and, thus, the method becomes undesirable for commercial use.

The method of the present invention for manufacture of Swiss cheese is further distinguished from conventional methods in that the fermented retentate is not subjected to a cooking step to a temperature of 120° F. to 128° F. and is not stirred for any substantial time at the elevated cooking temperature, i.e. is not "stirred out", prior to effecting evaporation of the retentate.

The retentate may also be mixed with a milk clotting enzyme commonly used in cheese manufacture and available commercially. Perhaps the best known milk clotting enzyme in cheese making is veal rennet. However, a number of other milk clotting enzymes are known in the cheese industry, as for example, microbial rennets, such as *Mucor meheii*.

While in the method of the invention as described, a milk clotting enzyme may be mixed with the fermented retentate, the invention does not require such enzyme addition due to the nature of the fermentation temperature and the starter culture system employed. In the method according to the invention, the use of a milk clotting enzyme becomes relatively unimportant. The addition of the enzyme, however, may contribute to the flavor development of the cheese product.

The retentate is then evaporated by any suitable method or apparatus to a moisture level of from about 35% to about 41%. During evaporation, it is desirable that the temperature of the product not exceed 85° F. Excessive temperatures result in bacterial inactivation, or die off, and reduced bacterial activity, as well as reduced enzyme activity, if used. Further, high temperatures can affect the casein and salts in the system. It is preferred that the retentate be evaporated under highly turbulent conditions in a suitable evaporator, such as a swept surface evaporator. It is preferred that the retentate be discharged from the evaporator at a temperature of below about 85° F. and at a moisture level of from about 35% to about 41%.

The product can be collected in a barrel or other container for curing. The product is cured by placing the barrel or container in a 45° F. storage room where it is held for 7-10 days. The product is then cured for an additional period of up to 30 days in a hot room having a temperature of 72° F. to 78° F. The product is then cured for a further period of up to several months in a finish cooler at a temperature of 35° F. to 40° F. After curing, eye formation has proceeded to an extent that the product is considered to be a typical Swiss cheese.

Salt (sodium chloride) is sometimes a necessary ingredient in the cheese. The term "salt," of course, includes salt substitutes. The salt can function in a number of ways in the process, but can also interfere with various operations. The salt may be added during fermentation to limit coagulation, but excessive salt can affect bacterial growth during fermentation. Salt can be added prior to evaporation and improve evaporation efficiency by lowering viscosity, but is not necessary to efficient evaporation. Further, salt can be added during evaporation or after evaporation as in conventional cheese manufacture. Thus, salt may be added at several points in the process. In any event, salt is added in an amount(s) which provides an end salt content typical of Swiss cheese.

The practice of the invention will be more clearly understood by reference to the following examples.

EXAMPLE I

Raw whole milk is stored at 40° F. and is standardized to a desired protein-to-fat ratio of about 0.79 and a total fat content of 3.5%. Standardization is achieved by the addition of cream or the removal of cream. Cream, which is heat-treated at 175° F. for sixteen seconds, is used when addition is necessary. The standardized milk is then pasteurized at 162° F. for sixteen seconds, cooled, and held at 40° F.

The standardized milk is subjected to ultrafiltration to achieve a concentration of 30% total solids, and then is diafiltered. The diafiltration is run at about 1.5 to 1 (water-to-concentrate). After diafiltration, ultrafiltration is continued until about 5.28-fold concentration, based upon the original milk volume, is achieved. The ultrafiltration- diafiltration process is conducted to achieve a lactose level of about 1.4% and to provide milk salts or ash at a level of about 1.9%. The retentate has about 36% total solids and 64% moisture.

The concentrated retentate is pasteurized at 165° F. for sixteen seconds and cooled to 60° F. and held in an agitated tank at about 60° F. until needed for fermentation. The maximum storage time at this temperature is less than sixteen hours. A temperature of 60° F. is employed because lower temperatures increase viscosity to unacceptable levels for the process. The retentate is found to be microbiologically stable under these storage conditions.

The concentrated retentate is then warmed to 100° F. for fermentation. A salt (sodium chloride) solution is added at a level of 0.4% (by weight of salt-to-retentate). A direct vat set mixed culture of *Streptococcus thermophilus* and *Lactobacillus helveticus* in a 1:1 ratio, is used to effect fermentatron. The mixed culture is added at a level of 2.6 grams per 100 pounds of retentate. *Propionibacterium shermanii* is added at a level of about 0.5 grams per 100 pounds.

The fermentation is carried out at 100° F.-105° F. for 10 hours and until the fermented retentate reaches a pH of about 5.1. The fermented retentate is then cooled to 72° F. prior to evaporation.

The fermented retentate is at a solids level of about 34.5% total solids and is then concentrated in a swept surface evaporator, specifically a Turba-Film evaporator, with a positive pump discharge.

A milk clotting enzyme, specifically New Marzyme, a modified *Mucor meheii* enzyme, is added to the fermented retentate about 10 seconds prior to evaporation. The milk clotting enzyme is added at a concentration of 0.0001% based on cheese and there is no coagulation or undue thickening of the fermented retentate.

The Turba-Film evaporator is operated so that the temperature of the product in the evaporator is between about 65° F. and 75° F. with a vacuum of between about 16 and about 22 millimeters of mercury absolute pressure. The product is collected from the evaporator at a temperature of about 80° F.

The product of the Turba-Film evaporator is collected under a vacuum to remove air and increase density, and filled into barrels. The product has a cheese-like texture and is not crumbly or grainy.

The barrel, after filling, is placed in a 45° F. cooler and is cured at that temperature for 8 days. The product is moved to a hot room at 75° F. and is cured at that temperature for 30 days. Typical Swiss cheese eye development occurs at the end of this curing period. The Swiss cheese product is then transferred to a finish cooler at 38° F. for final curing.

The Swiss cheese product has a total solids of about 61.4%, a fat of about 32.7%, a protein of about 23.4%, a salt (sodium chloride) of about 0.9% and an ash of about 4.5%. There is about 1.2% galactose in the cheese.

EXAMPLE II

Skim milk is pasteurized at 161° F. for 16 seconds and subjected to ultrafiltration to achieve a concentration of 5.0 fold, and then is diafiltered. The diafiltration is conducted to achieve a lactose level of about 1.2%. The diafiltration is conducted at about 4 to 1 (water to concentrate) yielding a final retentate which has about 36% total solids.

The concentrated retentate is pasteurized at 165° F. for 16 seconds and cooled to 90° F. The pasteurized skim milk is standardized to a desired protein-to-fat ratio of about 0.79 and a total fat content of 3.5%. Standardization is achieved by the addition of pasteurized cream (45% milk fat) at 45° F. The final retentate plus cream mix has a lactose level of about 1.2%, thus limiting pH reduction during fermentation to about 5.0. The retentate plus cream mix has about 27% total solids.

The unfermented retentate plus cream mix is then fermented and processed in accord with Example I.

EXAMPLE III

The procedure of Example I is followed except that the addition of sodium chloride is omitted from the fermentation step and an equivalent amount of sodium chloride is added after fermentation and prior to evaporation so that the product from the evaporator has a salt (NaCl) content of about 0.9%.

In summary, the invention provides Swiss cheese in high yield by a make procedure different than the procedure conventionally used to make Swiss cheese. The Swiss cheese flavor and texture is within the range normally seen in a Swiss cheese. The Swiss cheese is produced by a method distinguishable from prior known membrane processes in which retentates are evaporated to higher-solids and is uniquely different from such prior known processes and the products resulting therefrom in the utilization of specific cultures.

The various features of the invention which are believed to be new are set forth in the following claims:

What is claimed is:

1. A method for manufacture of Swiss cheese from milk comprising the steps of:
   (a) removing moisture, ash and lactose from milk to provide a retentate,
   (b) adding a mixture of a propionic acid producing culture, a coccus culture and a rod culture, to said retentate, the level of said rod culture being from about 0.1 to about 6 times the level of said coccus culture,
   (c) fermenting said retentate to a pH of from between about 4.8 and about 5.6, said fermentation being effected at a temperature of from about 92° F. to about 118° F.,
   (d) evaporating moisture from said retentate to provide a cheese product having from about 35% to about 41% moisture, and
   (e) curing said cheese product for a time sufficient to provide a Swiss cheese.

2. A method in accordance with claim 1 wherein a milk clotting enzyme is added in an amount of up to about 0.01% based upon cheese weight.

3. A method in accordance with claim 1 wherein the temperature of said retentate does not exceed about 85° F. during said evaporation step.

4. A method in accordance with claim 1 wherein said rod culture is galactose positive.

5. A method in accordance with claim 1 wherein said rod culture is selected from the group consisting of $L.$ helveticus, $L.$ bulgaricus and $L.$ lactis.

6. A method in accordance with claim 5 wherein said rod culture is $L.$ helveticus.

7. A method in accordance with claim 1 wherein said retentate has from about 60% to about 70% moisture and from about 1.2% to about 2.5% lactose.

8. A method in accordance with claim 1 wherein said coccus culture is $S.$ thermophilus.

9. A method in accordance with claim 1 wherein said milk is standardized to a fat level of about 3.4% and a protein to fat ratio of from about 0.75 to about 1.2.

10. A method in accordance with claim 1 wherein the pH level after fermentation is from about 4.8 to about 5.6.

11. A method in accordance with claim 1 wherein salt is added at a time period selected from the group consisting of during fermentation, after fermentation but prior to evaporation, during evaporation and mixtures thereof.

12. A method in accordance with claim 1 wherein said fermentation takes place at a temperature of from about 98° F. to about 105° F.

13. A method in accordance with claim 8 wherein said fermentation takes from about 5 to about 15 hours.

14. A method in accordance with claim 1 wherein said coccus culture is added to said retentate at a level of from about $10^4$ to about $10^6$ cells per ml of retentate and said rod culture is added to said retentate at a level of from about $10^4$ to about $10^6$ cells per ml of retentate.

* * * * *